United States Patent
Glehr et al.

(10) Patent No.: US 6,998,597 B2
(45) Date of Patent: Feb. 14, 2006

(54) CIRCUIT ARRANGEMENT FOR A PHOTODIODE

(75) Inventors: Manfred Glehr, Wenzenbach (DE); Stephan Heinrich, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/083,119

(22) Filed: Mar. 17, 2005

(65) Prior Publication Data

US 2005/0230602 A1    Oct. 20, 2005

(30) Foreign Application Priority Data

Mar. 30, 2004  (DE)  .................. 10 2004 015 619

(51) Int. Cl.
*H01J 40/14*    (2006.01)
(52) U.S. Cl. ................. 250/214 R; 250/214.1; 327/514
(58) Field of Classification Search ............ 250/214 R, 250/214.1; 327/514
See application file for complete search history.

(56) References Cited

U.S. PATENT DOCUMENTS 5,023,951 A * 6/1991 Kahn ..................... 398/202
5,966,159 A * 10/1999 Ogasawara ............. 347/133

* cited by examiner

*Primary Examiner*—Kevin Pyo
(74) *Attorney, Agent, or Firm*—Martin A. Farber

(57) ABSTRACT

A circuit arrangement (1) for a photodiode (2) has a microprocessor (3) with an output (4) which emits a pulse-width-modulated voltage signal via a low-pass filter (5) to the cathode of the photodiode (2). The voltage which is applied to the cathode of the photodiode (2) is detected by an input (12) of the microprocessor (3) and is regulated at a nominal value by adjusting the voltage signal at the output (4) of the microprocessor (3). The circuit arrangement (1) has a particular wide dynamic measurement range.

8 Claims, 2 Drawing Sheets

US 6,998,597 B2

CIRCUIT ARRANGEMENT FOR A PHOTODIODE

FIELD AND BACKGROUND OF THE INVENTION

The invention relates to a circuit arrangement for determining the radiation power of radiation which is incident on a photodiode, applies a voltage signal to a cathode of the reverse-biased photodiode and detects the photodiode voltage which is dropped across the photodiode.

A circuit arrangement such as this is known from TIETZE, Ulrich; SCHENK, Christoph: Halbleiterschaltungstechnik, [Semiconductor circuit technology], 9th Edition, Springer-Verlag, Berlin, 1989, pages 107–108. The known circuit arrangement has an operational amplifier, whose inverting input is connected to the cathode of the photodiode. The non-inverting input of the operational amplifier and the anode of the photodiode are connected to ground. The output of the operational amplifier is fed back via a non-reactive feedback resistance to the inverting input of the operational amplifier.

When light strikes the photodiode, a photocurrent flows via the photodiode and the feedback resistance, with the output of the operational amplifier being set to a voltage value which corresponds to the voltage drop across the feedback resistance caused by the photocurrent. The output voltage from the operational amplifier is then a measure of the photocurrent, and is thus a measure of the radiation power of the light striking the photodiode.

One disadvantage of the known circuit arrangement is its limited dynamic range. The radiation intensity of sunlight, in particular, varies to such a major extent that the photocurrent must be detected over a measurement range of $1:10^5$. The known circuit arrangement is therefore suitable only to a limited extent for applications in which the aim is to detect the photocurrent from photodiodes installed in solar sensors.

SUMMARY OF THE INVENTION

Against the background of this prior art, the invention is based on the object of specifying a circuit arrangement for a photodiode having a dynamic measurement range which is as wide as possible.

According to the invention, this object is achieved by a circuit arrangement having the features specified in the independent claim. Advantageous refinements and developments are specified in the claims which are dependent on this.

In the circuit arrangement for a photodiode, a voltage modulator applies a voltage signal to the cathode of the photodiode via a low-pass filter. A control unit detects the photodiode voltage which is dropped across the photodiode and controls the voltage modulator as a function of the photodiode voltage by means of a manipulated variable which can be evaluated for the determination of the radiation power. A voltage modulator with a downstream low-pass filter acts as an ideal voltage source, which is able to maintain a predetermined voltage value on the cathode of the photodiode irrespective of the light striking the photodiode. This is possible even when the photocurrent flowing through the photodiode covers a measurement range of about $1:10^5$. The photocurrent can thus be determined in a measurement range of $1:10^{15}$ by evaluation of the manipulated variable which controls the voltage modulator.

In one preferred embodiment, the voltage modulator is a pulse width modulator, whose pulse width can be varied in accordance with the intended dynamic measurement range. Pulse width modulators such as these are generally commercially available.

A commercially available microprocessor can be used for the implementation of the voltage modulator and of the control unit. Microprocessors such as these offer outputs at which, for example, pulse width signals with a variable width can be produced. Microprocessors such as these may also contain analogue/digital converters which can be used to detect the photodiode voltage.

When a microprocessor is used for the control unit and the signal modulator, the majority of the functionality of the circuit arrangement can be implemented in software.

In a further preferred embodiment, the control unit regulates the output signal from the voltage modulator at a predetermined photodiode voltage. This embodiment offers a high degree of accuracy for the determination of the photocurrent.

In a further preferred embodiment, the control unit readjusts the voltage modulator only when the photodiode voltage differs from a predetermined nominal value by a predetermined amount. Since, in this embodiment, the voltage modulator generally need be readjusted only rarely, this considerably shortens the reaction time of the circuit arrangement to small fluctuations in the photocurrent.

BRIEF DESCRIPTION OF THE DRAWINGS

Further features and advantages of the invention will become evident from the following description in which exemplary embodiments of the invention are explained in detail with reference to the attached drawing, in which.

DETAILED DESCRIPTION OF THE PREFERRED EMBODIMENT

Figure 1:
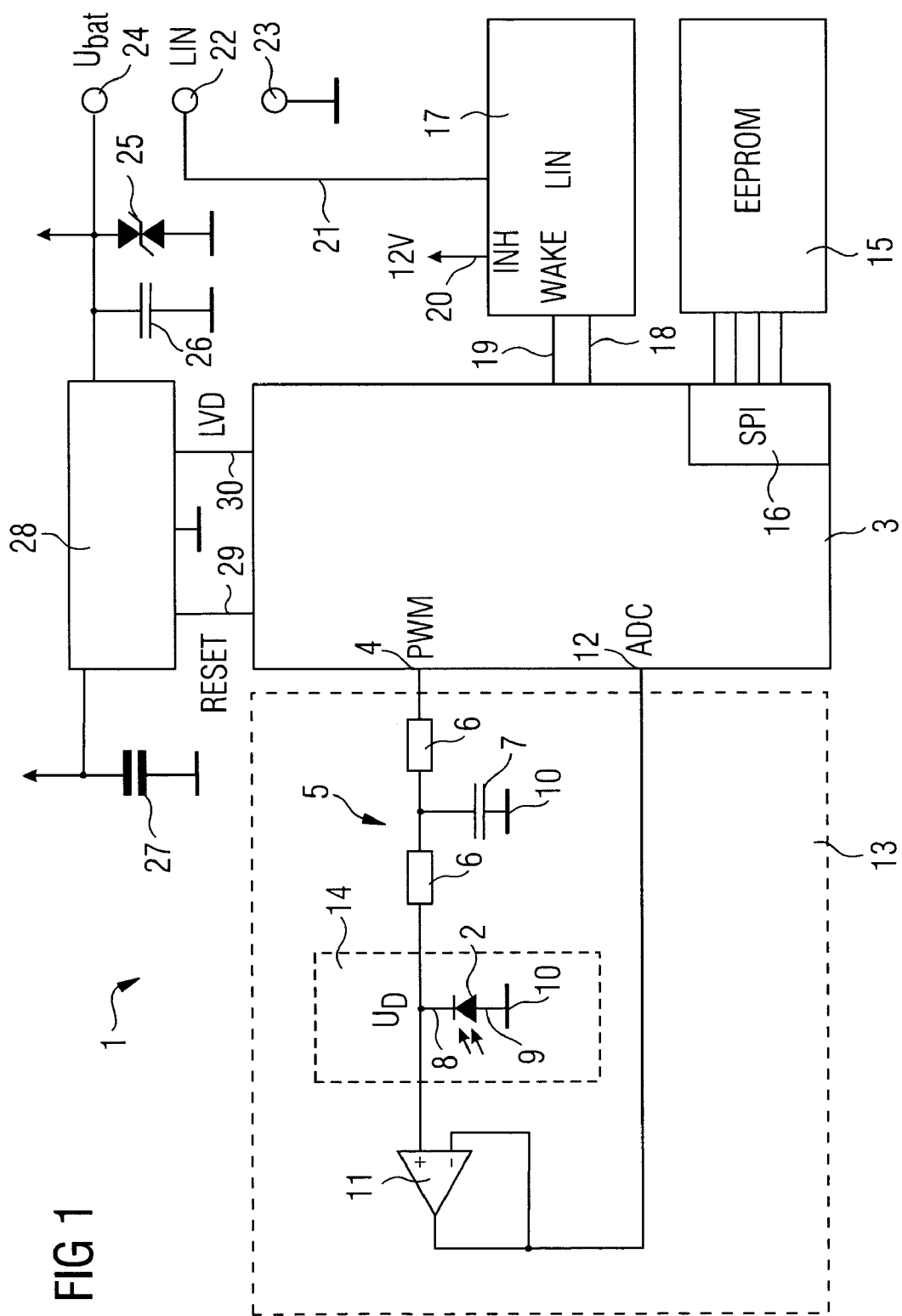
FIG. 1 shows a circuit diagram of a circuit for a photodiode, showing the components that are used.

FIG. 1 shows a circuit diagram of a circuit 1 which is used to determine the radiation power of radiation striking a photodiode 2. For this purpose, the circuit 1 has a low-cost microprocessor 3, which operates with 8 bits internally and emits a pulse width signal, which can be modulated, at an output 4.

The pulse width signal passes through a low-pass filter 5. In the exemplary embodiment illustrated in FIG. 1, the low-pass filter 5 is a so-called T filter, which has two non-reactive resistors 6 and a capacitance 7. Higher-order filters may also be used instead of the low-pass filter 5 but, if possible, these are designed such that a DC voltage signal is as far as possible also applied to a cathode 8 of the photodiode 2 only when the pulse width of the pulse width signal is set to the shortest intended value.

Since an anode 9 of the photodiode 2 is connected to ground 10, the photodiode voltage $U_D$ which is dropped across the reverse-biased photodiode 2 is equal to the voltage applied to the cathode 8. The voltage which is applied to the cathode 8 is supplied to an impedance converter 11, whose output acts on an input 12 of the microprocessor 3. As will be explained in more detail in the following text, the input 12 is allocated the function of an analogue/digital converter.

The low-pass filter 5, the photodiode 2 and the impedance converter 11 form a diode module 13, of which there may be more than one, in order, for example, to read different photodetectors 14 in a solar sensor, which each act as a photodiode 1.

The circuit 1 may have additional useful components added to it. By way of example, the circuit 1 as shown in FIG. 1 has an electrically erasable programmable read only memory 15 (EEPROM) which is connected to a serial peripheral interface 16 (SPI) of the microprocessor 3. The programs which are required for operation of the microprocessor 3 can be stored in the read only memory 15.

Furthermore, a transmitting/receiving unit 17 is connected to the microprocessor 3 that allows the microprocessor 3 to communicate with further appliances, for example using the LIN protocol. The transmitting/receiving unit 17 is connected via a data line 18 and a wake-up line 19 to the microprocessor 3. The microprocessor 3 can use the wake-up line 19 to switch the transmitting/receiving unit 17 to an operating state in which it is ready to transmit data. A blocking output 20 of the transmitting/receiving unit 17 is used, inter alia, to control a power supply unit which is not illustrated. Finally, a further data line 21 leads to a data connection 22 via which the circuit 1 can be addressed from the exterior, and via which data supplied from the circuit 1 can be received.

For the sake of completeness, FIG. 1 also shows a common ground connection 23 for the circuit 1. A further battery connection 24 is used to connect the circuit 1 to a supply voltage $U_{BAT}$. The supply voltage $U_{BAT}$ which is fed in via the battery connection 24 is stabilized by means of zener diodes 25, a capacitor 26, an electrolytic capacitor 27 and a voltage regulator 28. When the circuit 1 is started up, the voltage regulator 28 resets the microprocessor 3 via a reset line 29. A further signal line 30 (LVD) for indication of a low battery voltage $U_{BAT}$ resulting from the battery having a low state of charge can be used to cause the microprocessor 3 to cease operation and, if appropriate, to protect important registered contents in the read only memory 15.

Figure 2:
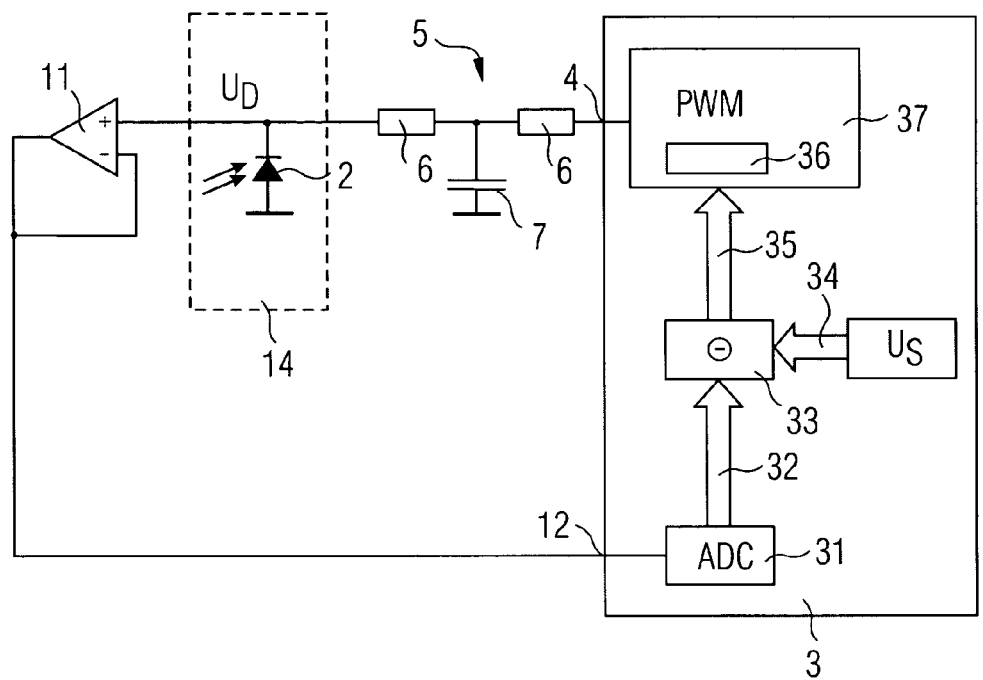
FIG. 2 shows a circuit diagram which illustrates in detail the operation of a microprocessor that is used for the circuit shown in FIG. 1.

FIG. 2 shows a block diagram illustrating in detail the operation of the microprocessor 3.

As already mentioned, the input 12 of the microprocessor 3 leads to an analogue/digital converter 31, which converts the diode voltage $U_D$ applied to the input 12 to a voltage value 32 which is subtracted in a subtractor 33 from a reference value 34 of a reference voltage $U_S$. This results in a difference value 35 which represents the discrepancy between the diode voltage $U_D$ and the reference voltage $U_S$. The difference value 35 is transmitted, for example, to a register 36 for a pulse width modulator 37. The pulse width modulator 37 then sets the width of the pulses emitted at the output 4 in accordance with the content of the register 36.

The register 36 for the pulse width modulator 37 may, for example, have a length of 16 bits. In this case, the circuit 1 has a dynamic measurement range of about $1:6*10^4$.

In one modified embodiment, the register 36 for the pulse width modulator 37 has a length of only 8 bits and is incremented or decremented whenever the difference value 35 exceeds a predetermined limit value. In this case, the bit length of the voltage value 32 can also be limited to 8 bits. This exemplary embodiment also allows a dynamic measurement range of $1:10^5$ to be achieved.

It should be noted that the method of operation of the microprocessor 3 illustrated in FIG. 2 corresponds to the operation of a proportional regulator. However, in a modified embodiment, the microprocessor 3 can also carry out the function of a PI regulator or of a PID regulator.

Both the content of the register 36 for the pulse width modulator 37 and the difference value 35 may be used as a measure for the radiation power of the light striking the photodiode 2, provided that the control error between the photodiode voltage $U_D$ and the reference voltage $U_S$ is not regulated to zero.

Figure 3:
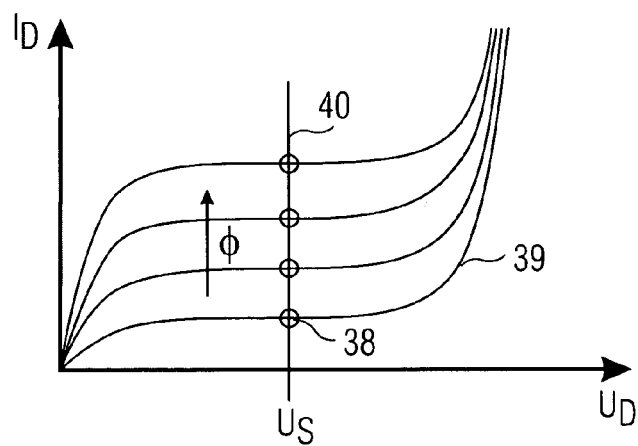
FIG. 3 shows a family of characteristics for a photodiode which can be used for the circuit shown in FIGS. 1 and 2, illustrating the operating points of the photodiode for different radiation intensities.

Finally, FIG. 3 shows a characteristic diagram for a photodiode 2 which can be used for the circuit 1. The characteristic diagram shows operating points 38 of the circuit 1 for different radiation intensities φ of the photodiode 2, which are in the form of intersections of the characteristic lines 39 with a vertical straight line 40 running through the reference voltage $U_S$.

The circuit 1 is particularly suitable for operation of photo detectors 14 which are located in solar sensors.

Solar sensors such as these are used in particular for determining the radiation intensity of incident sunlight and for determining the time of day. Particularly when solar sensors such as these are used for controlling an air conditioning system for a motor vehicle, the circuit 1 must have a dynamic measurement range of at least $1:10^4$.

We claim:

1. A circuit for determining the radiation power of radiation which is incident on a photodiode (2), wherein the circuit applies a voltage signal to the cathode (8) of a reverse-biased photodiode (2) and detects the photodiode voltage ($U_D$) which is dropped across the photodiode (2), the circuit comprising:
   the reverse-biased photodiode, a voltage modulator, a low-pass filter, and a control unit; wherein an output (4) of the voltage modulator (37) is connected via the low-pass filter (5) to the cathode (8) of the photodiode (2), and the control unit (31, 33) controls the voltage modulator (37) as a function of the photodiode voltage ($U_D$) with the aid of a manipulated variable (35, 36) used for determining the radiation power.

2. The circuit as claimed in claim 1, wherein the control unit (31, 33) and the voltage modulator (37) are implemented in a microprocessor (3).

3. The circuit as claimed in claim 1, wherein the voltage modulator (37) is a pulse width modulator.

4. The circuit as claimed in claim 1, wherein the control unit (31, 33) regulates the photodiode voltage ($U_D$) at a value of a reference voltage (Us).

5. The circuit as claimed in claim 4, wherein a value of a register (36) in the voltage modulator (37) is read in order to determine the radiation power of the radiation which is incident on the photodiode (2).

6. The circuit as claimed in claim 1, wherein the control unit (31, 33) readjusts the photodiode voltage ($U_D$) when a discrepancy between the photodiode voltage ($U_D$) and the value of a reference voltage ($U_S$) reaches a predetermined amount.

7. The circuit as claimed in claim 6, wherein a value of a register (36) in the voltage modulator (37) together with a difference value (35), which describes the discrepancy between the photodiode voltage ($U_D$) and reference voltage ($U_S$), is read for the determination of the radiation power of the radiation which is incident on the photodiode (2).

8. The circuit as claimed in claim 1, wherein the circuit has a dynamic measurement range greater than or equal to $1:2^{16}$.

* * * * *